: 2,762,318
Patented Sept. 11, 1956

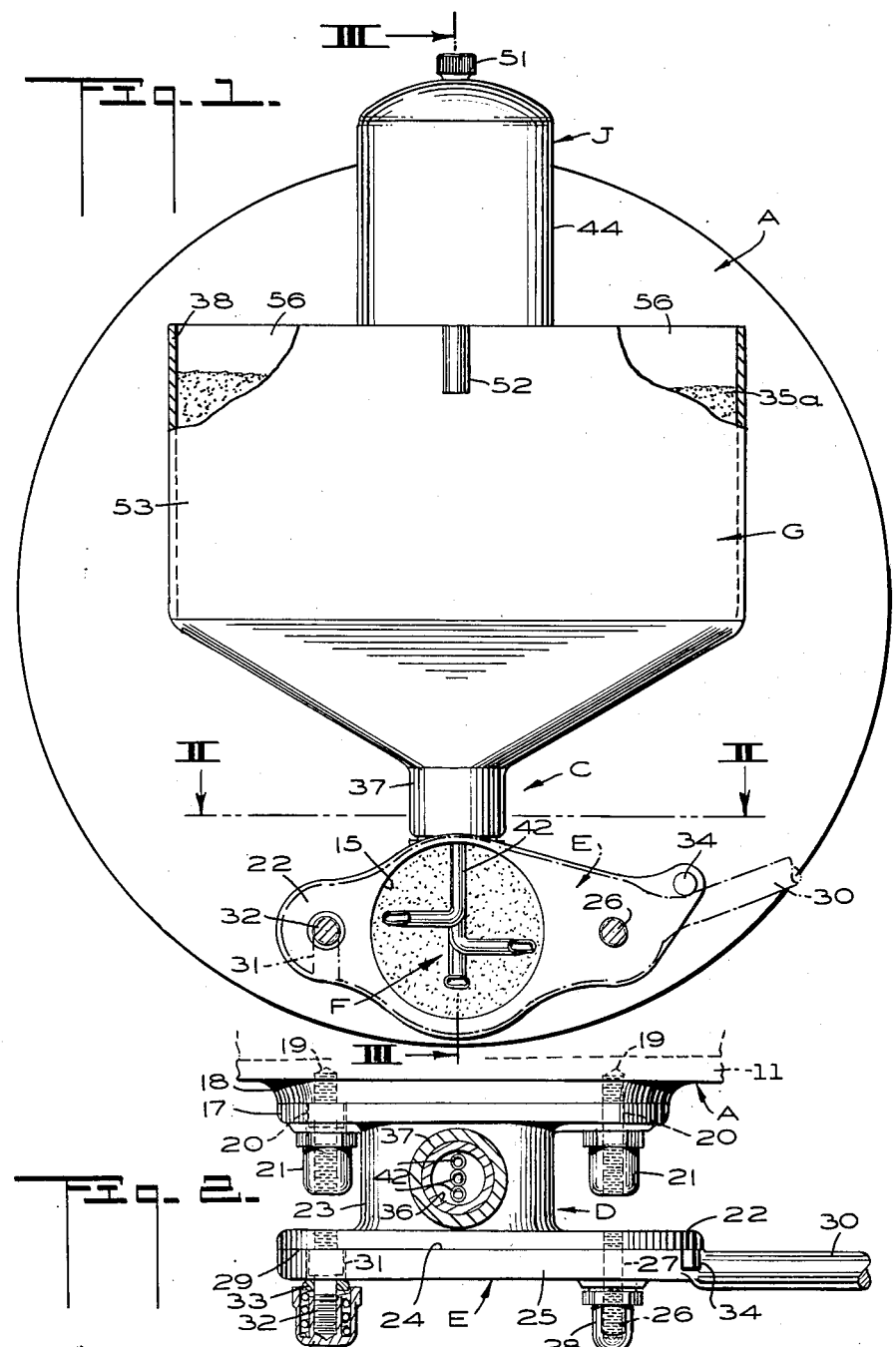

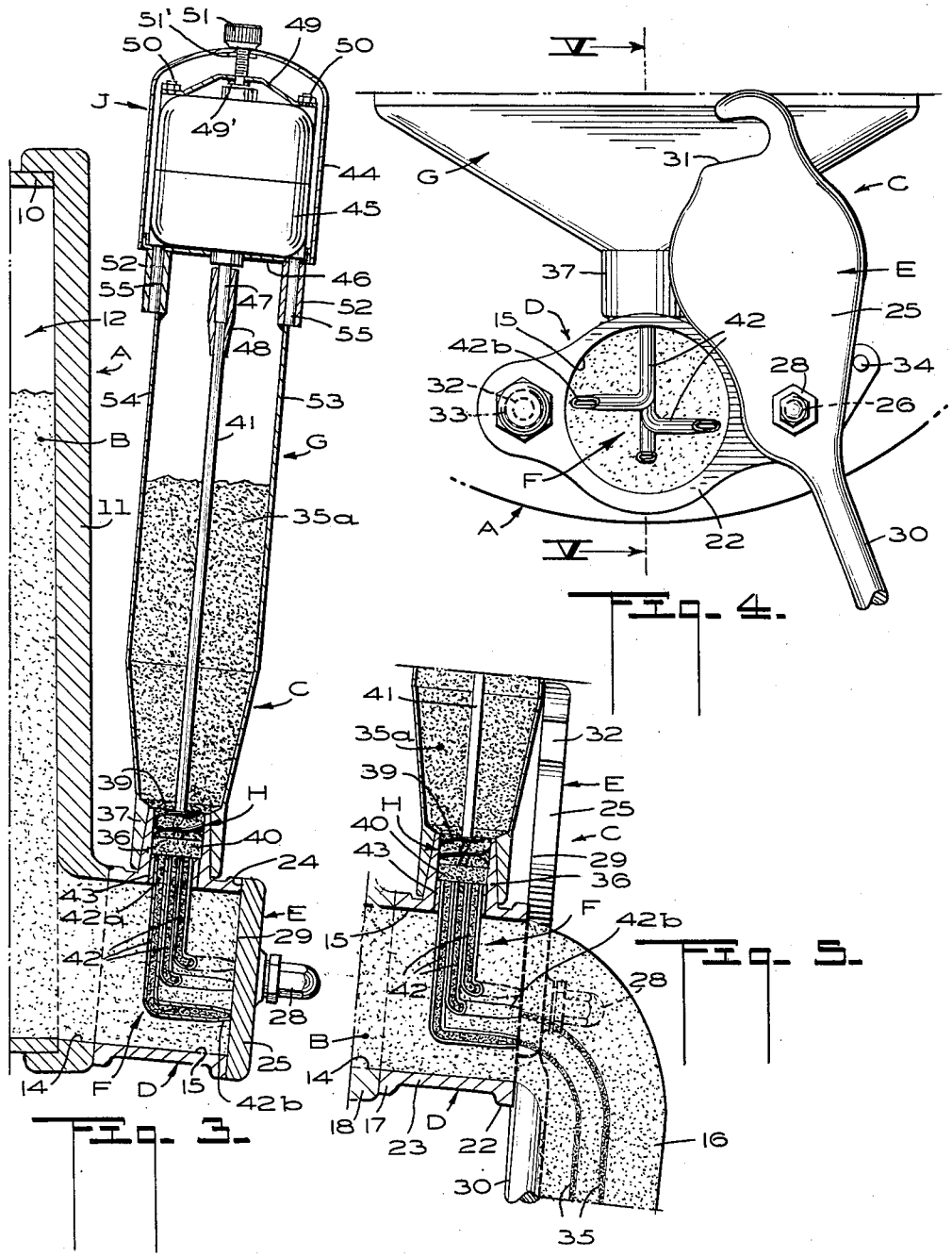

2,762,318

MARBLING ATTACHMENT UNIT FOR BATCH-TYPE ICE-CREAM FREEZER

Myron R. Prouty, El Cerrito, Calif.

Application May 19, 1955, Serial No. 509,666

8 Claims. (Cl. 107—1)

The present invention relates to improvements in a marbling attachment for a batch-type ice-cream freezer, and has particular reference to an attachment whereby various-colored cores may be injected into ice-cream. It consists of the combinations, constructions and arrangement of parts, as hereinafter described and claimed.

As the cardinal object of this invention, it is proposed to provide an attachment of the character described, which may be readily secured to a batch-type ice-cream freezer to marbleize the ice cream as the latter is discharged therefrom.

More specifically stated, I provide a self-contained unit which is adapted to be mounted over the discharge opening of a conventional batch-type ice cream freezer to thus extrude marbleizing cores into the ice cream being discharged. This unit includes a tubular adapter having a tank supported thereby for containing the syrups or other ingredients for the cores. Moreover, the unit is fashioned with a driven impeller arranged to force the core-producing igredients through a tube assembly, whereby the cores will be extruded into the interior of the outflow of ice cream.

Moreover, and as an important structural feature, a gate valve is arranged in such a manner as to control the discharge of both the ice cream and the ingredients for the marbleizing cores.

Another object is to provide a marbling attachment which is simple in construction, durable and efficient for the purpose intended.

Other objects and advantages will appear as the specification continues. The novel features will be set forth in the claims hereunto appended.

Drawings

For a better understanding of the invention, reference should be had to the accompanying drawings, forming part of this specification, in which:

Figure 1 is a front elevational view of my marbling attachment, with the gate valve thereof being omitted;

Figure 2 is a horizontal sectional view taken along the line II—II of Figure 1;

Figure 3 is a longitudinal sectional view taken along the vertical plane III—III of Figure 1, with the gate valve being disclosed in closed position;

Figure 4 is a view similar to Figure 1, but illustrating the gate valve in open position; and Figure 5 is a fragmentary sectional view taken along the line V—V of Figure 4.

While I have shown only the preferred form of my invention, it should be understood that various changes, or modifications, may be made within the scope of the annexed claims, without departing from the spirit thereof.

Detailed description

Referring to the drawings, a conventional batch-type ice-cream freezer is designated generally at A. As shown, it includes a cylindrical housing 10 having a flanged end wall 11 secured thereto, thus defining a freezing tank 12 adapted for holding ice cream B. The mix for the ice cream is placed in the cylinder, where it is whipped by a dasher (not shown), and the mix frozen into the ice cream. This end wall is fashioned at its lower portion with a discharge opening 14 through which the ice cream may flow (see Figures 3 and 5).

It will be noted that my marbling attachment unit is indicated generally at C. This unit includes a tubular adapter D, which is mounted on the end wall 11, with its passageway 15 arranged in communication with the discharge opening 14 of the freezer. Thus an outflow 16 of ice cream may be discharged from the Unit C (see Figure 5), when the gate valve E is opened in the manner hereinafter set forth.

For the purpose of mounting the adapter D on the freezer A, the adapter is provided with an inner flange 17 which is butted against a boss 18 formed on the end wall 11 so as to surround the discharge opening 14. As shown in Figure 2, a pair of studs 19 are anchored to the boss 18 and project through openings 20 fashioned in this flange. Nuts 21 are threaded on the outer ends of these studs so as to clamp the flange 17 against the boss 18 in liquid-tight relation therewith.

Moreover, the adapter is formed with an outer flange 22, which is arranged parallel and in spaced-apart relation with respect to the inner flange 17. The body of the adapter defines a tube 23. The passageway 15, previously mentioned, extends through this tube and both flanges of the adapter. The flange 22 has a finished outer face 24 defining a plane against which the gate valve E is adapted to operate.

In its structural features, the gate valve consists of a plate 25 of the shape disclosed in Figure 4. In order to swingably mount this plate, a hinge stud 26 is anchored in the outer flange 22 so as to extend through an opening 27 formed in the plate 25 (see Figure 2). A nut 28 is threaded on the stud 26 for the purpose of holding the inner face 29 of this plate in the plane of the outer face 24 of the flange 22, regardless of whether the gate valve is closed, as in Figures 2 and 3, or swung into open position, as in Figures 4 and 5.

It will be observed that an operating handle 30 is formed on the plate 25. When this plate is swung into closed position, a notch 31 formed therein fits over a stud 32, the latter being anchored to the flange 22, to project forwardly therefrom. A spring-loaded clamping washer 33 is provided on the stud 32 so as to urge the face 29 of the valve plate into liquid-tight relation with the face 24 of the outer flange, when the gate valve is closed (see Figures 1 to 3, inclusive). A stop pin 34 is provided on the flange 22 to limit the opening of the gate valve.

With particular reference to Figures 3 to 5, inclusive, it will be apparent that a plurality of marbleizing cores 35 are injected into the outflow 16 of the ice cream by a tube assembly F, as the ice cream is extruded through the adapter D. The ingredients 35a for providing these cores are contained in a tank G mounted on the adapter. Moreover, an impeller assembly H feeds the ingredients from the tank G to the tube assembly F.

In its structural details, the adapter D is fashioned with a tubular inlet fitting 36 at its top, which communicates with the passageway 15. An outlet spout 37 on the bottom of the tank is telescoped over this fitting. The tank has an open top defining a rim 38 to thus allow the ingredients 35a to be placed therein. The impeller assembly H includes a rotor 39, which is arranged in the bore 40 of the inlet fitting. This rotor is secured to and operated by a shaft 41 forming part of a motor assembly J.

Structurally, the tube assembly F includes a plurality of tubes 42 which have their upper inlet ends 42a secured to a bushing 43. The latter is pressed into the bore 40 below the rotor 39 (see Figures 3 and 5). The lower outlet ends 42b define nozzles that are disposed in the plane of the front face 24 of the flange 22. Accordingly, when the gate valve E is swung into closed position, as shown in Figure 3, the plate 25 of this valve will provide a closure over the outlet ends of these tubes, thereby cutting off further flow of the ingredients 35a from the tank G. At the same time, flow of ice cream through the passageway 15 will be stopped. Quite obviously, when the gate is opened, as shown in Figure 4, both the passageway 15 and the nozzle ends of the tubes 42 will be uncovered to permit outflow of ice cream and the marbleizing ingredients.

In Figure 4, the outlet or nozzle ends 42b of the tubes are shown as being spread apart relative to one another to thereby distribute the marbleizing ingredients at different points in the outflow 16. Moreover, the upper sections of the tubes 42 are shown in Figures 3 to 5, inclusive, as being arranged one in back of the other along the length of the passageway 15 to thereby offer less obstruction to the extruding of the ice cream through the passageway 15 of the adapter.

Turning now to the motor assembly J, it will be noted that an inverted cup-shaped housing 44 has an electric motor 45 arranged on its interior, the lower end of this housing being closed by a flanged disc 46. The motor is arranged substantially vertically, and has its shaft 47 connected to the impeller shaft 41 by a coupler 48. In order to adjust the motor within its housing, and thereby raise or lower the rotor 39 in the bore 40, a strap 49 is secured to the motor by studs 50. Also, an adjustment screw 51 has its shank threaded through a nut 51', which is welded to the top wall of the housing 44. The lower end of this shank is provided with a thrust ring 49', disposed below the strap 49. Thus the rotor 39 may be raised part way out of the inlet fitting 36, when the motor is screwed up. When the gate 25 is open and the marbling syrup 35a is flowing through the tubes 42, the flow can be decreased by raising the rotor. Thus the person making the marbled ice cream may vary the amount of the syrup. When the rotor is all the way down, as shown in Figure 3, the maximum amount of syrup will be discharged, and this amount can be decreased by raising the rotor. This eliminates any speed-control on the motor.

The motor assembly J is supported on the rim 38 of the tank G, centrally thereof. Vertically-extending sleeves 52 are fixed to the front and back walls 53 and 54, respectively, of the tank. The sleeves are adapted to have pins 55 telescoped thereinto, these pins being carried by the underneath side of the motor.

In mounting the motor assembly J on the tank, the impeller shaft 41 is guided so that its rotor 39 will enter the bore 40. As the housing 44 is moved towards the rim 38 of the tank G, the pins 55 are telescoped into the sleeves 52 until the disc 46 comes to rest on the rim 38. At this time, the rotor 39 will be disposed in spaced relation with the top of the bushing 43 to provide ample clearance therebetween. Even when the motor housing is mounted on the tank, there are ample open spaces 56 on both lateral sides of the housing 44 to allow the marbleizing ingredients 35a to be introduced into the tank G. The spaces 56 give access to the interior of the tank G, even though the motor assembly J is disposed on the tank. The adapter D constitutes a support for the tube assembly F and the tank G, together with its motor assembly J, thus providing a compact and self-contained unit.

*Summary of operation*

Having thus described the various parts of my marbling attachment unit for a batch-type ice-cream freezer, the operation thereof is summarized briefly as follows:

Assuming that a quantity of ice cream B is contained in the freezer A, and that appropriate ingredients 35a for marbleizing the ice cream have been placed in the tank G, the motor 45 is started. This will result in turning the rotor 39, forcing the ingredients downwardly through the tube assembly F. The ice cream flows into the passageway 15 so as to fill the latter.

Now the gate valve E is swung into open position (see Figure 4), thus uncovering the passageway 15 and the nozzle ends 42b of the tubes 42. This will allow an outflow 16 of ice cream (see Figure 5). At the same time, the marbleizing cores 35 are injected into the stream of ice cream being extruded. Upon closing the gate valve, the flow of both the ice cream and the core ingredients will be stopped.

When cleaning the attachment, the motor assembly J may be readily removed from the tank G by lifting it upwardly. This will withdraw the impeller assembly H. Also, the tank may be removed from the tubular inlet fitting 36. Upon reassembling, all parts of the attachment are supported by the adapter D forming part of the attachment.

During operation, the gate valve E may be closed, as shown in Figure 3, while the motor 45 continues to drive the rotor 39. Even though the ingredients 35a cannot flow through the tubes 42 when the gate valve is closed, the rotor 39 may continue to turn, thereby merely agitating the ingredients 35a in the bottom of the tank G.

I claim:

1. In a marbling attachment unit for an ice-cream freezer: a tubular adapter having a passageway extending therethrough; means mounting the adapter over a discharge opening of the freezer, with its passageway communicating with the discharge opening; a tank mounted on the adapter and supported thereby, and being made for holding marbleizing ingredients; a tube assembly carried by the adapter, and including a plurality of tubes having inlet ends communicating with the tank to receive the ingredients therefrom; these tubes having outlet nozzles disposed in the passageway of the adapter and having their outlets terminating in the plane of the passageway outlet to distribute the marbleizing ingredients in an outflow of ice cream extruded through the passageway; and a single gate valve movably carried by the adapter and being movable into a position to close off both the passageway of the adapter and the outlet nozzles of the tubes.

2. The combination as set forth in claim 1; and in which the tubes have upper sections disposed in the passageway of the adapter, and arranged one in back of the other along the length of the passageway to thereby reduce obstruction to the outflow of ice cream.

3. In a marbling unit attachment for an ice-cream freezer: a tubular adapter having a passageway extending therethrough; means mounting the adapter over a discharge opening of the freezer, with its passageway communicating with the discharge opening; the adapter having a finished face defining a plane; a tubular inlet fitting having a bore communicating with the passageway of the adapter; a tube assembly carried by the adapter, and including a plurality of tubes having inlet ends disposed within the bore of the fitting to receive marbleizing ingredients introduced into said bore; these tubes having outlet nozzles disposed in the plane of said finished face of the adapter; and a movable gate valve carried by the adapter, and having an inner face arranged in said plane; the gate valve being movable into a position to form a closure over both the passageway of the adapter and the outlet nozzles of the tubes.

4. The combination as set forth in claim 3; and in which a bushing is supported in the bore of the inlet fitting; the inlet ends of the tubes being anchored to this bushing.

5. In a marbling attachment unit for an ice-cream freezer; a tubular adapter having a passageway extending therethrough; means mounting the adapter over a discharge opening of the freezer, with the passageway communicating with the discharge opening; a tank mounted on the adapter for holding marbleizing ingredients; a tube assembly carried by the adapter, and including a plurality of tubes having inlet ends communicating with the tank to receive the ingredients therefrom; these tubes having outlet nozzles disposed in the passageway of the adapter to distribute the marbleizing ingredients in an outflow of ice cream extruded through the passageway; the tank being open at its top and defining a rim; a motor assembly mounted on the rim of the tank, and including a motor; and an impeller assembly disposed in the tank, and including a rotor operatively connected to the motor to be driven thereby; the rotor being located to force the marbleizing ingredients from the tank into the tube assembly.

6. The combination as set forth in claim 5; and in which the motor assembly is disposed substantially centrally relative to the tank, with the rim of the tank providing open spaces on opposing lateral sides of the motor assembly, thereby giving access to the interior of the tank.

7. The combination as set forth in claim 5; and in which sleeves are secured to walls of the tank, and the motor assembly is provided with pins telescoped into the sleeves to removably support this assembly on the rim of the tank.

8. In a marbling attachment unit for an ice-cream freezer: a tubular adapter having a passageway extending therethrough; means mounting the adapter over a discharge opening of the freezer, with its passageway communicating with the discharge opening; a tubular inlet fitting on the adapter having a bore communicating with the passageway of the adapter; a tank mounted on and supported by said fitting, and made for holding marbleizing ingredients; a tube assembly carried by the adapter, and including at least one tube having an inlet end disposed within the bore of the fitting to receive marbleizing ingredients introduced into said bore from the tank; the tube having an outlet nozzle disposed in the passageway of the adapter to deliver the marbleizing ingredients to an outflow of ice cream extruded through the passageway; a motor assembly mounted on the tank and supported thereby, and including a motor; an impeller assembly disposed in the tank, and including a substantially upright shaft connected at its upper end to the motor to be driven thereby; the impeller assembly further including a rotor secured to and driven by the lower end of the shaft, and being arranged in said bore of the tubular inlet fitting; and adjustable means operable to elevate the motor and raise the rotor part way out of said bore to thereby decrease the flow of the marbleizing ingredients through said tube; said means being operable to depress the motor and lower the rotor in said bore, thereby increasing the flow of said ingredients through said tube to the outflow of ice cream.

References Cited in the file of this patent

UNITED STATES PATENTS

| | | |
|---|---|---|
| 1,242,562 | Laskey | Oct. 9, 1917 |
| 2,125,729 | Kretchmer | Aug. 2, 1938 |
| 2,639,678 | Martin | May 26, 1953 |
| 2,646,757 | Hackmann | July 28, 1953 |
| 2,667,846 | Grumbly | Feb. 2, 1954 |